Dec. 5, 1950   R. W. PHELPS   2,532,675
WAGON AXLE AND REACH CONNECTION CONSTRUCTION
Filed Oct. 1, 1947

INVENTOR
R. W. PHELPS
By: Fetherstonhaugh & Co.
ATT'YS

Patented Dec. 5, 1950

2,532,675

UNITED STATES PATENT OFFICE 2,532,675

WAGON AXLE AND REACH CONNECTION CONSTRUCTION

Ross William Phelps, Orillia, Ontario, Canada

Application October 1, 1947, Serial No. 777,303

2 Claims. (Cl. 280—125)

1

This invention relates to improvements in the construction of farm wagons, and more especially to an improved axle construction and an improvement in the manner of connecting the reach to the axle.

Until now it has been usual in farm wagon construction to form an axle having a steel section, or in some cases steel supported in wood, and to connect the axle to the wagon reach by passing a king pin through aligned holes bored through the wagon reach and axle. Drilling the axle in this manner to receive the king pin has the disadvantage that it considerably weakens the axle at a critical section, namely at the center where the load is applied. Also, according to the prior art, the wood, in the wood and steel axle constructions, was often further weakened by cutting away for the purpose of mounting fifth wheels and clamp locks. Furthermore, the wood and steel sections used were not entirely satisfactory from the standpoint of operation. The wood had a considerable tendency to slip on the steel.

I have invented a means for connecting a wagon reach to an axle, and an axle construction, which are substantially better than those of the prior art. I overcome the disadvantages of having to weaken the axle by drilling it to receive the king pin, and of having to cut into it to mount a fifth wheel or clamp lock. I further provide an axle having a steel and wood section in which the wood will not slip on the steel, and which is considerably stronger for a given size than the axles of the prior art.

According to my invention the wagon reach is connected to the axle through at least one connecting plate. The connecting plate is secured to the axle by bolts or other suitable means, and the king pin passes through aligned holes in the reach and in the connecting plate, to pivotally connect the reach to the axle. Preferably two connecting plates are employed, one abutting the top and the other abutting the bottom surfaces of the axle.

I preferably employ an axle which comprises a wooden section having a longitudinal groove therein adapted to snugly receive a metal section. The wooden section extends the full length of the axle and shackles or clamps are employed to secure the wood and metal sections together.

The invention will be clearly understood after reference to the following detailed specification taken in conjunction with the accompanying drawings.

2

Figure 1:
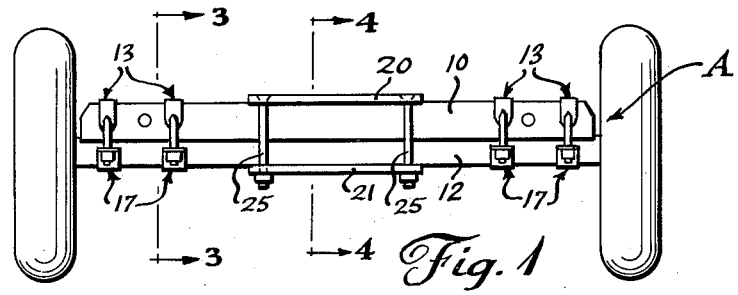
Figure 1 shows a front elevation of a front axle of a farm wagon mounted on wheels according to the invention.
Figure 4:
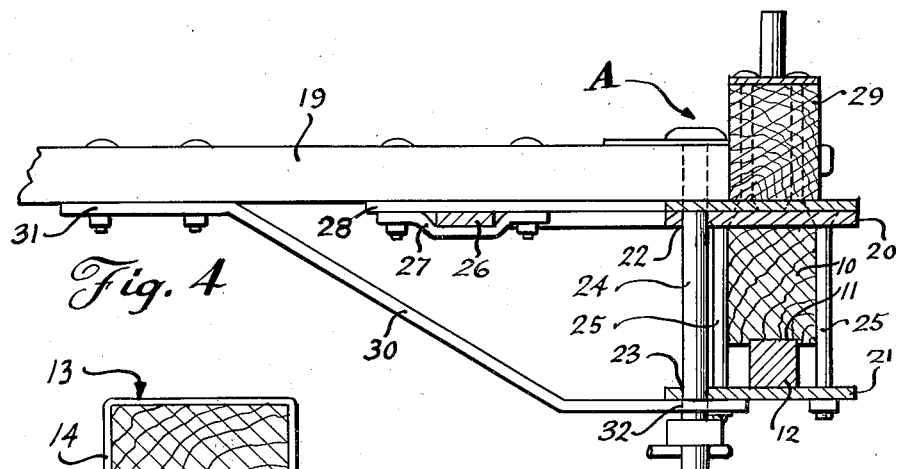

Figure 4 is a section along 4—4 of Figure 1, showing the manner in which the reach is connected to the axle according to the invention. The wagon bolster sand plate and bolster are also shown in this figure. They are omitted from Figure 1 for clarity.

Figures 3, 5:
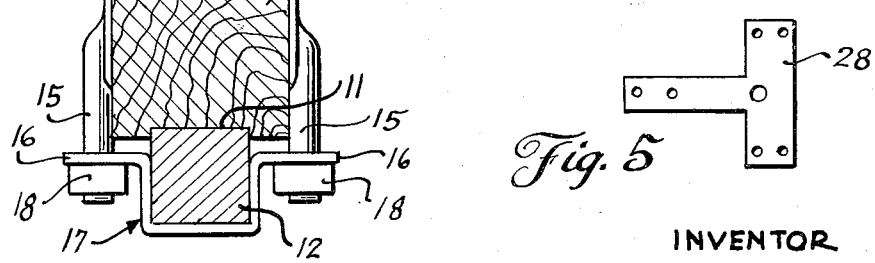
Figure 3 is a section of the axle shown in Figure 1 along line 3—3, showing a manner of shackling the wood and metal sections together.

Figure 5 is a plan view of a bolster sand plate.

Referring to the drawings and first to Figure 1, the letter A refers to an axle construction according to this invention. The axle comprises a wooden section 10 longitudinally grooved as at 11 to snugly receive a metal section 12. The wood and metal sections are shackled together by means of clamps 13. In the embodiment shown, the clamps comprise two U-shaped sections. A top section 14 fits over the wooden axle section 10 and has bolts 15 secured to it on either side which pass through flanges 16 on the lower U-shaped clamp section 17, which is designed to fit over the metal section 12. The bolts 15 are threaded on their free ends to receive nuts 18 whereby the clamp can be tightened to shackle the axle sections together.

With this construction, the wooden section can not slip on the steel section of the axle, due to the large contact area and the snugness of the fit between them. Both the front and the rear wagon axles can be built in this manner.

According to my invention the wagon reach 19 is connected to the front axle through suitable plates 20 and 21. In the embodiment shown, these plates abut the top and bottom respectively of the axle A and have aligned holes 22 and 23 adjacent the axle, which are adapted to receive the king pin 24 to pivotally connect the axle to the reach. The plates are secured to the axle by any suitable means such as by bolts 25 abutting against the front and back of the axle.

Figure 2:
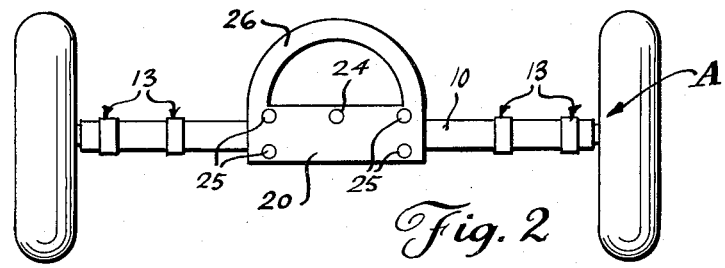
Figure 2 is a plan view of Figure 1.

The top plate 20 can be formed with a fifth wheel 26 extending therefrom. This is shown in Figures 2 and 4. In Figure 4 a circle keeper 27, bolted to the bolster sand plate 28 and reach 19, passes over the fifth wheel.

Numeral 29 in the drawings indicates a bolster. A reach brace 30 bolted to the reach as at 31 and bored to pass over the king pin 24 as at 32 adds strength to the wagon. This is well known wagon construction, however, and need not be enlarged upon here.

It will be noted, in my wagon construction, that the king pin does not pass through the axle. Further, it is not necessary to cut away the wooden portion of the axle in order to mount the fifth wheel or any other supporting structure. With my invention it is possible to attain maximum strength with a minimum of materials.

What I claim as my invention is:

1. In a wagon a reach, an axle having a wooden and a metal section, said wooden section being formed with a longitudinal groove to snugly receive the metal section, means for shackling said sections together, means for pivotally connecting the reach to said axle comprising two connecting plates, one plate overlying the other and abutting the top surface of the axle and projecting beyond the front and back edges of the top surface of the axle, the other plate abutting the bottom surface of the axle and projecting beyond the front and back edge of the bottom surface of the axle, bolts, the projecting portions of said plates being formed with aligned bores to receive said bolts in abutting relation to the front and back surfaces of the axle, the projecting portions of said plates to the front of said axle being formed with aligned reach king pin bores.

2. A wagon as claimed in claim 1 in which the overhanging portion of the said first mentioned plate is formed as a fifth wheel.

ROSS WILLIAM PHELPS.

REFERENCES CITED

The following references are of record in the file of this patent:

UNITED STATES PATENTS

| Number | Name | Date |
| --- | --- | --- |
| 707,896 | Bennett | Aug. 26, 1902 |
| 899,660 | Divers | Sept. 29, 1908 |
| 1,195,662 | Duemler | Aug. 22, 1916 |